Patented Aug. 17, 1948

2,447,056

UNITED STATES PATENT OFFICE 2,447,056

MANUFACTURE OF EXPANDED THERMO-PLASTIC MATERIALS

Alfred Cooper, Croydon, England, assignor to Expanded Rubber Company Limited, Croydon, England No Drawing. Application October 10, 1944, Serial No. 558,077. In Great Britain October 5, 1943

1 Claim. (Cl. 260—88)

This invention relates to the production of thermoplastic materials in cellular form.

In my co-pending application Serial No. 543,424 a process for the production of cellular thermoplastic resinous compositions is described, the said process comprising impregnating with an inert gas under pressure a stiff dough of the thermoplastic composition plasticised with a solvent or swelling agent which can be removed at temperatures below the softening temperature of the composition, reducing the external pressure to expand the dough and finally removing the plasticising agent sufficiently to harden the plastic. The present invention is concerned with processes of this type, but more particularly with the production of a suitable dough of the thermoplastic material. Polyvinyl chloride and co-polymers thereof do not respond to the impregnation treatment above described, owing to the fact that the gas or gases used in this high pressure treatment are not absorbed by the material, owing to lack of permeability even though high pressures between 1,000 and 10,000 lbs. per square inch may be employed; the result being that a material of far too great a density is produced. Attempts have been made to meet this difficulty by employing blowing agents, but it has not been practicable to disperse the blowing agents evenly throughout the mass and consequently uneven cell formation results.

Certain plasticisers are insoluble, or only very sparingly soluble, in polyvinyl chloride at normal or lower temperatures, but on heating the plasticiser swells the polymer rapidly and it passes first through a very viscous stage and finally gels. Continued heating of the gel causes a change in the physical consistency very similar to that which takes place when rubber is vulcanised; i. e. it becomes stronger and more extendable and capable of retaining gas bubbles under pressure.

It is an object of the present invention to make use of these properties of polyvinyl chloride and to same extent also of its co-polymers to produce vastly improved expanded or cellular plastics.

Thus, polyvinyl chloride in powder form may be made into a thin paste with, for example, dibutyl phthalate. At this stage other powdered materials may be easily admixed so that if the gassing of the material is to be carried out by incorporating blowing agents, these may be very conveniently introduced at this stage owing to the intimate and uniform mixing which may be effected before the paste thickens and passes ultimately into a gel. If, however, the gassing is to be carried out by direct impregnation, it has been found that the gel obtained, when the polyvinyl chloride paste is heated, is very permeable to gases under pressure, and moreover the final expanded material may be controlled to some extent by control of the gel formation as hereinafter described.

According to the present invention a process for preparing expanded polyvinyl chloride or co-polymers thereof comprises forming a gel by heating a paste of the said polymer and a plasticiser which has no appreciable solvent or swelling action thereon at normal temperatures, but swells it and forms a gel at elevated temperatures; forming gas bubbles in the gel and heating the gel sufficiently to enable it to retain its cellular formation.

The procedure for forming gas bubbles in the dough or gel will vary according as to whether direct gas impregnation under pressure is employed or whether a blowing agent is used, as will be clear to those acquainted with the art of expanding rubber. Thus, according to one feature of the invention, a blowing agent is incorporated into the paste before the latter is gelled and the paste with the blowing agent incorporated therein is heated to a temperature sufficient to form the gel but not sufficient to liberate the gas, and when the gel is formed the temperature is raised sufficiently to form the gas.

According to another feature of the invention, the gas bubbles are formed in the gel by submitting the latter to impregnation by an inert gas, such as nitrogen or carbon dioxide, under pressure (e. g. 4,000 lbs. per square inch) at room temperature.

Conveniently when direct high pressure gas is employed for the purpose of gassing polyvinyl chloride, the paste is made with a plasticiser content of between 40% and 80% on the dry weight of the polyvinyl chloride in order to attain suitable penetration and consequent even and low density material.

Dibutyl phthalate, dihexyl phthalate and tricresyl phosphate are suitable plasticisers for polyvinyl chloride.

Having obtained the gel either with blowing agents incorporated therein or with the desired consistency for direct gas impregnation, the procedure is exactly analogous to that adopted with a rubber dough, containing the necessary vulcanising ingredients. That is to say it may be milled and the necessary fillers and pigments incorporated and sheeted out, gassed and expanded, the subsequent heat treatment taking the place of the vulcanising steps in the case of expanded rubber, due regard being paid as in the latter case to attaining sufficient cohesion of the material to prevent escape of the gas before releasing the external support, if a closed cell material is required.

The invention will now be described with reference to the two specific procedures (I) using a blowing agent (II) using direct gas impregnation.

*Example I*

A paste-like dispersion of about 28% polyvinyl chloride and about 72% di-butyl phthalate is kneaded with 6 per cent of diazoamidobenzene until a homogeneous mixture is produced. It is then heated until it thickens and passes through a highly viscous stage, at the end of which it assumes a rubber-like consistency. At this stage it is milled on mixing rollers. Some difficulty may be experienced in the material sticking to the rollers, but this may be overcome by the addition of small quantities of water. The mass is sheeted out to a suitable thickness and set aside for the heating process during which expansion takes place. This is divided into two stages, the first part bringing about the hardening in 20 minutes using 40 lbs. per square inch steam pressure for heating, causing the polyvinyl chloride dispersions to set hard enough to retain the gas. The temperature is then increased to that equivalent to 100 lbs. per square inch steam for 10 minutes. This constitutes the second part of the process which causes the effective decomposition of the blowing agents and produces the expansion of the material.

It is essential for the press to be cold before the expanded material is removed. It is also essential to fill the mould with a blank considerably smaller than the finished moulding in order to allow for ample expansion.

*Example II*

A paste-like dispersion of about 28% polyvinyl chloride and about 72% tricresyl phosphate is at first gelled by heating to give a thermo-plastic rubber-like material, the extent of its rubber-like characteristics depending on the specific plasticiser employed and the amount present. This gel, which constitutes the first part of the process, is best carried out by pouring the dispersion into a metal tray of either a horizontal or vertical type, the thickness of the final gelled sheet being determined by the depth of paste. The gelling action is very critical being governed by the temperature and length of the gellation period. A high temperature favours gellation, but under these conditions there is a tendency towards blistering on the surface in contact with the metal. A suitable heating cycle for gelling is 2 hours at 125° F. although higher temperatures up to 150° F. may also be used.

After gellation the sheet is allowed to cool on the tray before removal. It is then gassed in a high pressure autoclave for 4 hours at 4,000 lbs. per square inch, at room temperature. The density of the finished product depends on the gas pressure used. For this reason pressures between 500 and 5000 may be chosen depending on the ultimate density required. The time of gassing depends on the thickness of the material to be permeated with gas. For a sheet ¼-inch thick 4 hours is suitable, but here again the thickness depends on actual conditions of manufacture.

After gassing the sheet is allowed to stand at room temperature in order that it may assume equilibrium and expand freely, whereupon it is placed in a hot room or oven at about 54° C. and allowed to expand further. This expansion period may extend to 2 hours or more.

This gassed material requires further heat treatment in order that a suitably expanded material may result. After full expansion the sheet is wrapped on a mandrel in cotton or duck or other fabric and given a heating cycle, for half an hour in a hot oven at 110° C.

The product can be improved still further by the addition of a cross linking agent such as zinc oxide, and thereby a more stable expanded material which is not prone to gas diffusion can be obtained. This also renders the product more heat-resisting. For this improvement the zinc oxide is first dispersed in dibutyl-phthalate or other plasticiser, and this homogeneous dispersion is added to the polyvinyl chloride paste prior to the gelling treatment. Other cross-linking agents may be used for the purpose, the object being obtaining an expanded product which will withstand temperatures of approximately 70° and 100° C.

Such expanded polyvinyl-chloride products find useful application in replacing expanded soft rubber materials and can be made in densitites similar to those of expanded soft rubber, that is to say, between 10 and 20 lbs. per cubic foot.

Such a low density polyvinyl-chloride product has not been hitherto produced and is believed to be a new method of manufacture with many useful applications.

What I claim is:

The process of making expanded bodies having closed cells of polymerized polyvinyl chloride monomers, which comprises mixing to a pasty consistency a dispersion of the powdered polymer and a plasticizer, the plasticizer constituting 40–80% of the weight of the polymer, then heating the paste under atmospheric pressure to a temperature of 125–150° F. to set the paste to an initial gel, cooling the gel to room temperature, then impregnating the gel with gas under a pressure of 500–5000 pounds per square inch for a period of about 4 hours, then allowing the sheet to expand freely at room temperature, then heating to about 130° F. for two hours to strengthen the gel, to thereby retain the expanding gas and also produce gas expansion, and thereafter heating to 230° F. to obtain the final expanded material.

ALFRED COOPER.

REFERENCES CITED

The following references are of record in the file of this patent:

UNITED STATES PATENTS

| Number | Name | Date |
|---|---|---|
| 2,371,868 | Berg | Mar. 20, 1945 |
| 2,386,995 | Wigal | Oct. 16, 1945 |

FOREIGN PATENTS

| Number | Country | Date |
|---|---|---|
| 429,316 | Great Britain | May 28, 1935 |
| 500,298 | Great Britain | Feb. 7, 1939 |
| 502,759 | Great Britain | Mar. 24, 1939 |